United States Patent [19]

Braugenhardt et al.

[11] 4,167,652

[45] Sep. 11, 1979

[54] METHOD AND APPARATUS FOR THE INTERCHANGES OF PCM WORD

[75] Inventors: Anders E. S. Braugenhardt, Skärholmen; Nils A. Hedin, Älvsjö; Gustaf H. V. Odhelius, Handen; Johan O. Ånäs, Huddinge, all of Sweden

[73] Assignee: Telefonaktiebolaget L M Ericsson, Stockholm, Sweden

[21] Appl. No.: 869,150

[22] Filed: Jan. 13, 1978

Related U.S. Application Data

[63] Continuation of Ser. No. 725,368, Sep. 22, 1976, abandoned, which is a continuation of Ser. No. 619,965, Oct. 6, 1975, abandoned.

[30] Foreign Application Priority Data

Oct. 17, 1974 [SE] Sweden ............................... 7413086

[51] Int. Cl.² .................................................. H04Q 11/04
[52] U.S. Cl. ............................ 179/15 AT; 179/15 AQ
[58] Field of Search .......... 179/15 AQ, 15 AT, 15 AL

[56] References Cited

U.S. PATENT DOCUMENTS

| | | | |
|---|---|---|---|
| 3,458,659 | 7/1969 | Sternung | 179/15 AQ |
| 3,644,679 | 2/1972 | Tallegas | 179/15 AQ |
| 3,678,205 | 7/1972 | Cohen | 179/15 AQ |
| 3,715,505 | 2/1973 | Gordon | 179/15 AQ |
| 3,840,707 | 10/1974 | Hemdal | 179/15 AQ |
| 3,864,525 | 2/1975 | Edstrom | 179/15 AQ |

Primary Examiner—David L. Stewart
Attorney, Agent, or Firm—Hane, Roberts, Spiecens & Cohen

[57] ABSTRACT

An integrated switching and transmission of PCM words associated with channels and transferred on links utilizing the time-time switching principle is achieved by connecting an interhighway, i.e., a common time multiplex connection on which the PCM words are transferred in bus time slots, to inward and outward traffic memory arrangements each associated with one of the links. The memories store the words and in addition not only store, for each established connection channel, index numbers indicating the actual incoming and outgoing channel, but also a time index number indicating which bus time slot during an index read out phase is used for the connection. The phases are introduced in order to avoid the necessity of using memory access times corresponding to the bus time slots. Each phase comprises a number of bus time slots and each frame of the PCM words includes at least so many such phases as there are channels on each link. The stored channel and time index numbers are read by means of a regular scanning at a frequency defined by the phases. By means of the channel index numbers irregular sequences are achieved for the PCM words according to the established connections. By means of the time index number read during the respective phase the actual PCM word is transferred to and from the interhighway.

4 Claims, 3 Drawing Figures

METHOD AND APPARATUS FOR THE INTERCHANGES OF PCM WORD

CROSS REFERENCE TO RELATED APPLICATIONS

This is a continuation of application Ser. No. 725,368 filed Sept. 22, 1976, now abandoned, which, in turn, is a continuation of Ser. No. 619,965 filed Oct. 6, 1975, now abandoned.

BACKGROUND OF THE INVENTION

The present invention relates to a method and apparatus for the transmission of PCM words by means of a plurality of memory arrangements each of which being associated with one PCM link and which are included in a PCM exchange for switching the PCM words from incoming channels in incoming links to outgoing channels in outgoing links via a bus arranged as a common time multiplex connection wherein the PCM words are transferred on the links in link time slots and on the bus in bus time slots; and the memory arrangements store, on the one hand, the PCM words before and after switching, and on the other hand switching information concerning the channels which cooperate in the incoming and outgoing links, respectively.

A time-multiplex-PCM-system is obtained if on each of n links q analog information signals are transferred, each information signal being allotted a link time slot with length or duration T1 within a frame period F. In standardized system F=125 $\mu$s and q=32 information channels, i.e., T1$\approx$4 $\mu$s. During each time slot the amplitude of the respective analog signal is indicated in coded form by a PCM word, for example by 8 pulses in series wherein each pulse has a negative or positive polarity to indicate one of two binary states. It follows that the pulses in the series are transferred in 0.5 $\mu$s intervals, i.e., with a pulse repetition rate of 2 MHz. In a synchronous system full coincidence exists for the frames and time slots and pulses, respectively, of all links.

The function of a digital time multiplex exchange is to switch an incoming signal in a channel za during the link time slots tla on a link La so that the signal is outgoing on a link Lb in a channel zb during the link time slots tlb. Consequently it is typical that the space switching (change from link La to link Lb) is accompanied by a time switching (from time slot tla to time slot tlb).

It is known, for example, by the Swedish Pat. No. 351,541 (U.S. Pat. No. 3,864,525) how to carry out time switching by means of memory arrangements. In this connection word memories are used in order to store the PCM words during the time between the time slots tla and tlb. Each of the word memories which is associated with a link, has to be sufficiently large to store all PCM words within a frame, and comprises consequently for standardized systems 32 groups of 8 memory elements. Since in one and the same memory the write operations must never (inclusive the switching case tla=tlb) overlap the read operations, then, according to the above standardized system, there must be access time of 0.25 $\mu$s, corresponding to a pulse base frequency fa=4 MHz so that the operations being controlled i.e., the writings and readings occur during the first and second halves of the time slots, respectively. The addressing operations of the word memories for reading and writing are controlled by means of a cyclical scanning arrangement and by means of a decoder which is fed with channel indices za, zb cyclically read from an index memory, as it will be described below.

While the time switching in this manner will be achieved completely without expensive gate multiplex switching arrangements the space stage of a PCM exchange comprises gate matrixes which are activated by means of control signals obtained from a control unit and the synchronization of the exchange often causing great problems. In said Swedish Pat. No. 351,541 an exchange is described which comprises one space stage arranged between two time stages (time-space-time principle). Because of the two time switchings executed in the two time stages the space switching can be made completely independent of the inward and outward time slots tla and tlb, respectively as will hereinafter become apparent.

Furthermore, there is described, for example, in "Colloque International de Commutation Electronique, Paris 1966" by an article "Switching, synchronising and signalling in PCM exchanges" of W. Neu and A. Kundig, how such space switching is avoided if the time switching is combined in such a way with a multiplex formation change, that all the r=n·q channels of the system are associated with just one common time multiplex connection, in the following denoted as a bus, so that there is allotted to each unit of information a bus time slot with length T2=t1/n. Even if it is assumed that the signals are transferred by means of parallel pulses on each bus which according to the standard example consists of 8 parallel lines, then according to the above analysis a pulse base frequency fb=1000·4/8=500 MHZ is obtained for, for example, n=1000 links. Since no presently known memories operate with 2 ns-access times, such systems with only time switching have heretofore been limited to comparatively small PCM exchanges.

SUMMARY OF THE INVENTION

An object of the present invention is, while retaining the advantages of a system without space switching, to reduce the demand which is put on the access times in the word and index memories, and to make such access times independent of the link number of the PCM transit system.

Briefly, the invention contemplates a method of integrated switching and transmission of PCM words which are incoming and outgoing in channels on links wherein each channel within frames is associated with a link time slot and the switching is carried out by means of an interhighway operating as a common time multiplex connection on which the PCM words are transferred in bus time slots and set up between inward and outward traffic memory arrangements each being associated with one incoming and outgoing link, respectively. The method is performed by storing in corresponding locations of the inward and outward memory arrangement associated with an established connection in which the respective link is involved a channel index number associated with the incoming and outgoing, respectively, channel of the connection and a time index number which is the same for the respective inward and outward memory arrangement. The incoming and outgoing PCM words are written into the inward memory arrangements and read from the outward memory arrangements cyclically, by means of a regular scanning occurring at a frequency defined by the link time slots while the channel and time index numbers are read cyclically, by means of a regular scanning occurring at a frequency defined by index read out phases wherein each phase includes a number of bus time slots and each frame includes at least so many phases as there are link time slots. The PCM words are read from the respective inward memory arrangement in an irregular sequence determined by means of the channel index numbers read from the inward memory arrangement. The PCM words of an actual connection are transferred to and from the interhighway under the control of the time index number associated with the connection. And the PCM words are written in the respective outward memory arrangement in an irregular sequence determined by means of the channel index numbers read from the outward memory arrangement.

DESCRIPTION OF THE DRAWING

Other objects, the features and advantages of the invention will be apparent from the following detailed description when read with the accompanying drawing wherein.

DESCRIPTION OF THE PREFERRED EMBODIMENT

In order to achieve an easier understanding of the invention, the general switching principle involved will be described with respect to the time-time system shown in FIG. 1 which uses a bus IHW connecting the read output of an inward word memory Wa to the write input of an outward word memory Wb. By buffer storing the PCM words in the memories Wa and Wb, by means of an inward index memory Ia and an outward index memory Ib, for each transferred PCM word an inward and outward time switching is obtained. As in a time-space-time system, thanks to the two time switchings, a bus time slot optionally fixed by means of a time index number x can be chosen for the transferring on the bus IHW, as will now be explained in more detail in connection with the description of FIGS. 1 and 2.

The write inputs in inward word memory Wa are connected to the links La1 to Lan. On each link each of the PCM words 1 to 32 is transferred within a frame period and is written into an allotted memory element group. In FIG. 1 the symbols 1.01 . . . 1.32 indicate buffer stored PCM words which have been transferred via the link La1. The allotting of respective memory element group is carried out by means of slowly working low-rate scanning arrangements LRSa, the scanning symbols indicating that the cyclical scanning is started by frame timing pulses fF and is stepped by timing pulses f1 in synchronism with the link time slots. In FIG. 1 no attention has been paid to whether the switching system uses series or parallel transfer of PCM words. A serialized addressing of the elements of the memory element groups demands, for example, a further scanning arrangement which is started by timing pulses in synchronism with the link time slots and stepped by the series pulses, while a parallel transfer means that the elements of a group are addressed simultaneously for, for example, writing the PCM words transferred on parallel lines.

Figure 1:
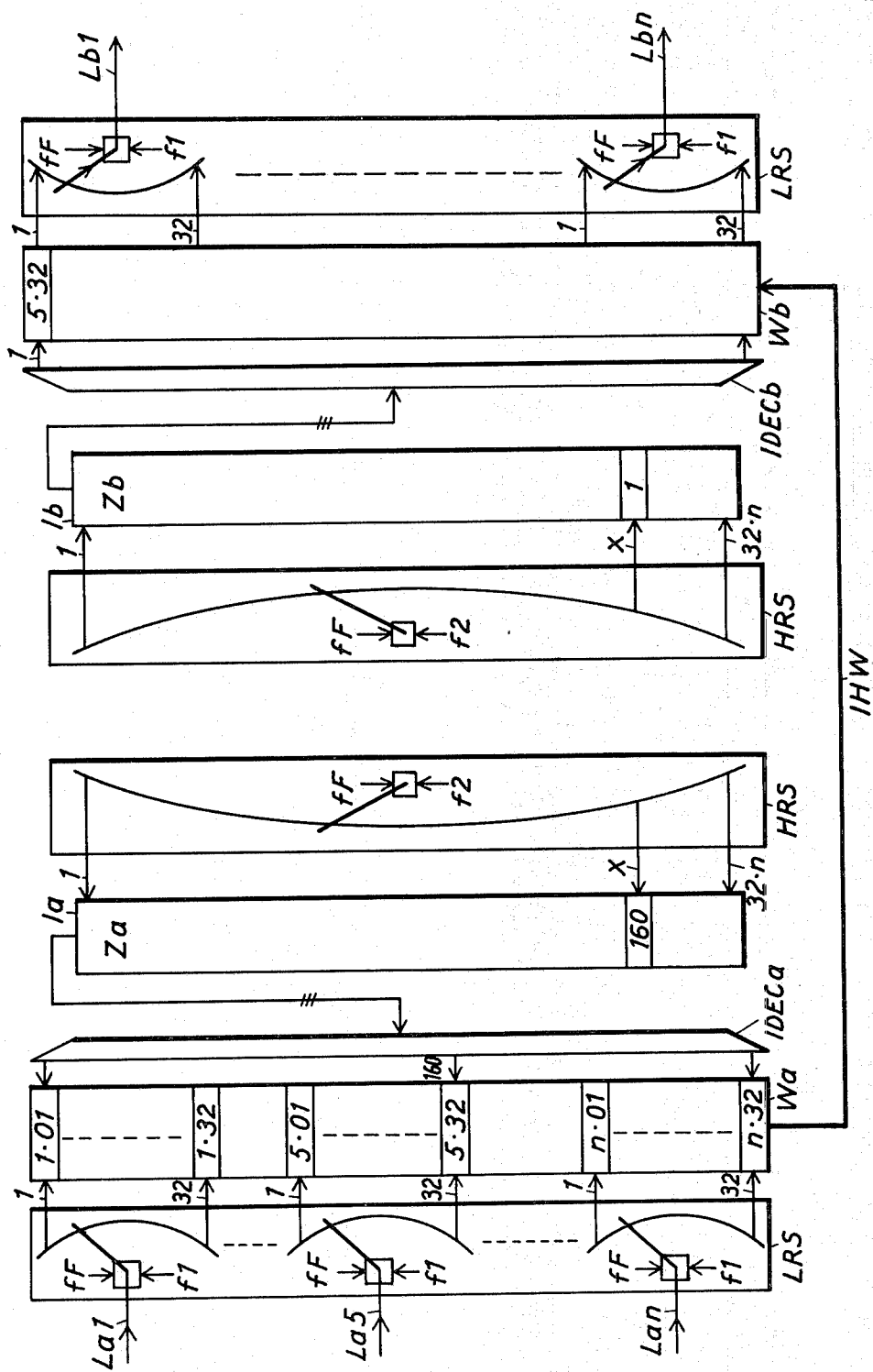
FIG. 1 is a block diagram of a simplified time-time system.

According to FIG. 1 each of the index memories Ia and Ib are read by means of a fast working high-rate scanning arrangement HRSa and HRSb. It is assumed that each index memory comprises $32 \times n$ memory element groups for 32 channels in n links. The cyclical fast scanning is started by frame timing pulses fF and is stepped by timing pulses f2 in synchronism with the bus time slots so that each element group of the index memory storing channel indexes $z_a$, $z_b$ is read during bus time slot with duration T2. The read outputs of the index memories are connected to inward and outward index decoders IDECa and IDECb which decode the channel indexes and activate an element group indicated by the respective channel index in the inward word memory Wa for reading and in the outward word memory Wb for writing, respectively. It is preferable to use parallel transfer for the channel indexes comprising several binary signals, as it is indicated in FIG. 1. There are not shown units such as delay lines for compensating for possible time displacements when it is assumed that the transfer and decoding of the indexes do not influence the required frame synchronism in write and read addressings of the word memories. In the bus time slot with time index number x according to FIG. 1 the channel index 160 is transferred to the inward index decoder IDECa, and the channel index 1 is transferred to the outward index decoder IDECb. The index 160 activates in the inward word memory Wa for reading the element group which contains the PCM word 5.32. Consequently, this word is transferred in series or in parallel on the bus IHW during the bus time slot with time index number x. The index 1 activates in the outward word memory Wb the element group assigned to the first link time slot on the outgoing link Lb1 to accept the PCM word then being transferred on the interhighway BUS (in this case the word in element 5.32 of inward memory Wa).

In this way, by means of two channel indexes, an information signal which is received in an arbitrary link time slot on an arbitrary incoming link, is switched to an arbitrary link time slot on an arbitrary outgoing link. It obviously does not matter which time index x is chosen for the transfer on the bus. A congestionless switching requires, as it has been assumed above, that there is for each information signal at least one bus time slot. A faultfree switching requires, as mentioned above but for clearness sake not shown in FIG. 1, that the write and read operations in one and the same memory element group never collide. The certainty against such a collision is enforced, for example, if a computer choses each time index x so that the bus time slot in question, does not occur within the link time slots tla and tlb for the inward and outward channels respectively which are to be switched. By making such a rule the above-mentioned dividing up of the bus time slots in write and read halves respectively is not required. However, the rule causes a switching congestion if on the bus a multiplex formation with only $r = n \cdot q$ channels is arranged. It should be apparent that the up-till-now described switching principles without space stages are suitable only for relatively small exchanges.

Figure 2:
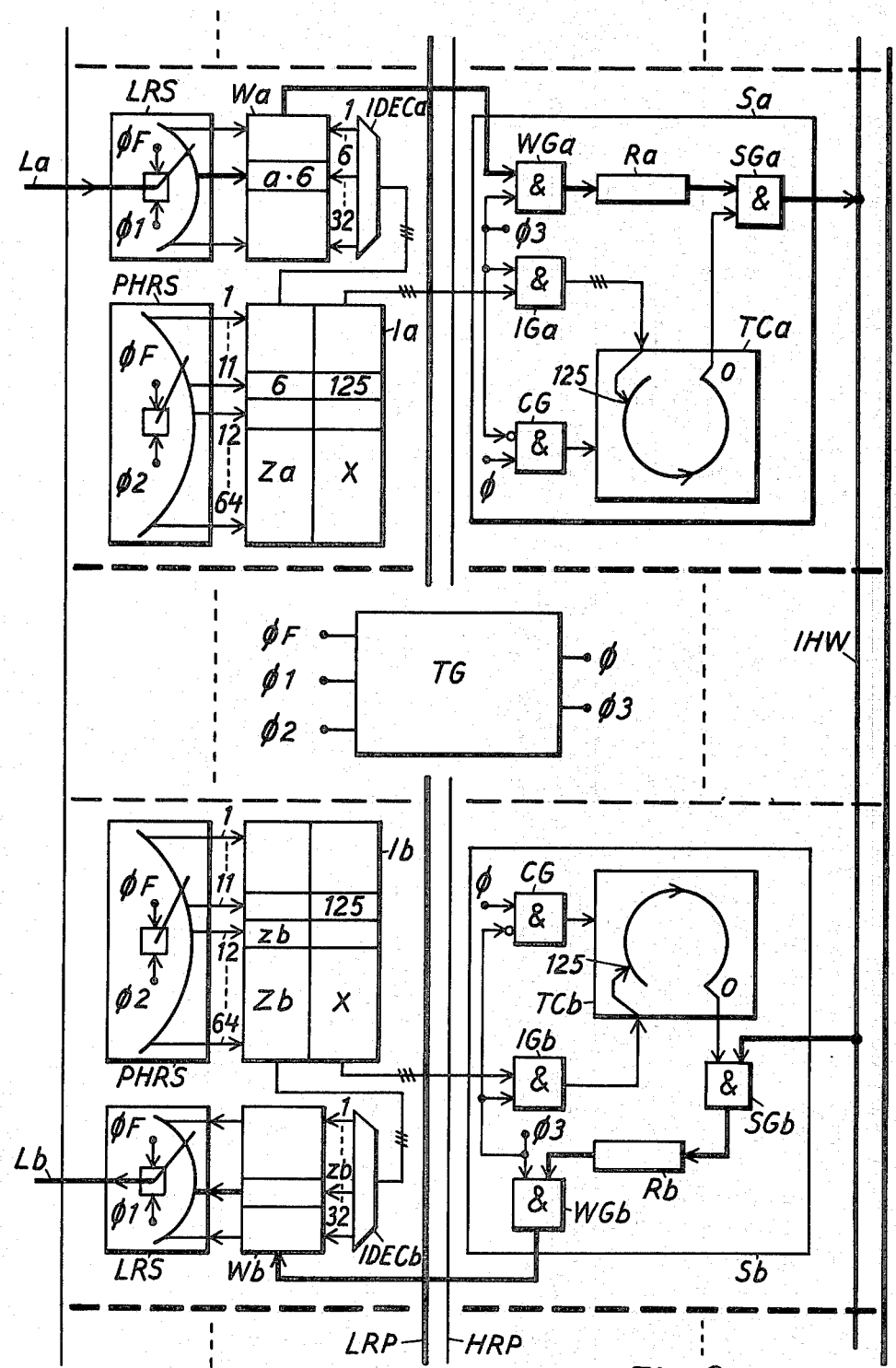
FIG. 2 is a block diagram of a time-time system incorporating an interhighway and controlled by a timing generator utilizing the teachings of the invention.

FIG. 2 shows a switching system according to the invention, proposed for larger exchanges, in which system all the memory arrangements are included in a low-rate part LRP. To simplify the disclosure only the memory arrangements are shown which cooperate with one of the n inward links La and with one of the n outward links Lb in order to transfer respective PCM words to and from a high-rate part HRP which, in addition to the interhighway bus IHW, comprises sluice-in and sluice-out units Sa and Sb.

Two decentralized time switchings are carried out, each concerning its link. It should be noted beforehand that at least one exceptional rule is valid for the selection of a bus time slot, so when a congestion risk arises it can always be defeated by arranging on the bus a multiplex formation with $s > n \cdot q$ channels, whereby certainly advanced demand is put on said high-rate part but whereby the access time demand put on the low-rate part is not influenced, as will appear from the following description. Therefore only the access times of the high-rate part limit the switching capacity of the exchange, and it is assumed that the fast multiplex formation is chosen so that the high-rate part works reliably.

The immunity of the access times of the low-rate part to the size of the exchange, i.e., the number of links, is obtained by the decentralization of associating each link with its memory- and sluice arrangements, and by controlling each time switching by means of a phase number y and by means of two index numbers which comprise a channel index number z and a time index number z. The memory arangements comprise word and index memories Wa, Wb, Ia, Ib for storing the PCM words and the index numbers. By means of transmission in parallel the channel index numbers z are read to an index decoder IDECa, IDECb associated with the respective word memory and the time index numbers x are read to a time counter TCa, TCb associated with the respective link. The element groups of the word memories are addressed by means of said index decoders and by means of low-rate scanning arrangements LRS completely in agreement with the manner described in connection with FIG. 1. On the other hand, the index memories are read according to FIG. 2 by means of phase-rate scanning arrangements PHRS stepped phase by phase. The bus IHW is, via buffer registers Ra, Rb each being associated with its link, connected to the word memories Wa, Wb. As it will be explained the time counters TCa and TCb in the sluice arrangements Sa and Sb control the time during which the PCM words are stored in the buffer registers Ra and Rb before and after, respectively, being transferred on the bus IHW. A time index number x determines which bus time slot within the phase in question is used for the transfer on the bus. In general the decentralization of the exchange need not require that the word and index memories are controlled by means of their own respective scanning arrangement, besides a number of memories of the same kind may be controlled of a common scanning arrangement. One choses the variant which gives the best synchronization condition.

Figure 3:
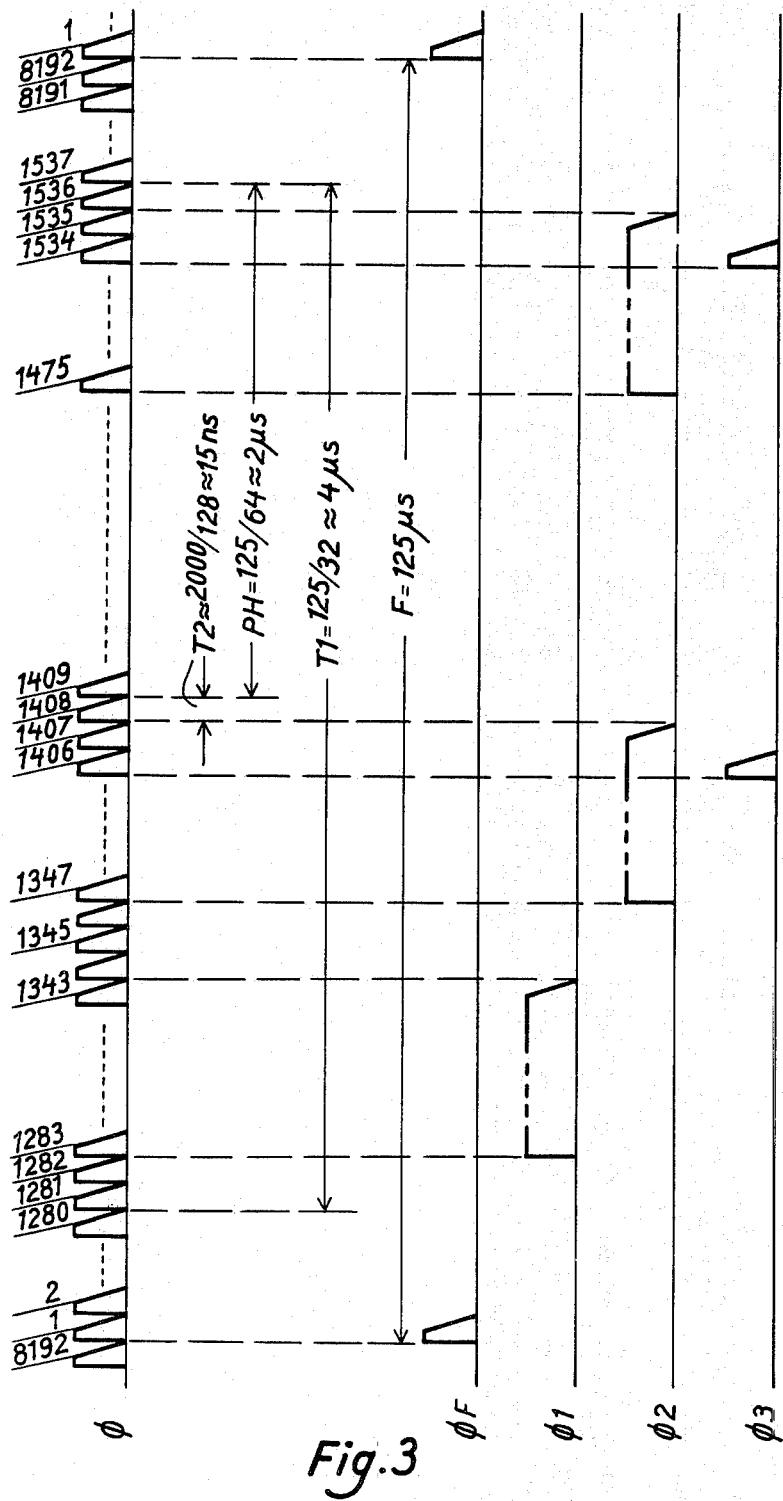
FIG. 3 is a timing diagram of the pulses generated by the timing generator of FIG. 2.

There are certain relations between the link time slots with length T1, the bus time slots with length T2, the phases with length PH used for stepping of the scanning arrangements PHRS of the index memories and the length F of the frame periods these relations which are achieved by means of a synchronizing timing generator TG are shown by the timing diagram in FIG. 3 wherein $T1 = F/q$ and $T2 = F/s$ with q and s as the number of channels on each of the links and on the bus, respectively. If it is assumed that a phase has a time length $PH = F/m$, owing to the repeating rule, m has to be an integral number and it must be $m \geq q$ otherwise there is no time for, for example, the PCM words stored in an inward word memory to be read completely within a frame. A dimensioning with $m = s$ would lead to a switching principle corresponding to the one shown in FIG. 1. The dimensioning within the limits $q \leq m \leq s$ must however fulfill the equation $s = m \cdot k$ with k as an integral number, i.e., that a phase comprises k bus time slots. For the equation $m = c \cdot q$, it is, however, not required that c is an integral number. If the size of the exchange, as mentioned above, is indicated by means of the number n for the quantity of incoming and outgoing links, the selection $s > n \cdot q$ as well as the selection $m > q$ contribute to reduce the risk for congestion which is forced upon the rule inserted by means of the stepping rate of the index scanning arrangements, that the element groups of the word memories are addressed by means of decoding the channel index only once during a phase. The Calculus of Probability shows that it with $c = 2$ already for $r = n \cdot q$ bus channels a practically nonexisting risk for congestion is achieved. Suitably the integral number m is chosen so that reliable accesses are achieved in the memory arrangements.

In FIG. 2 there is not shown how a computer or another arrangement selects the above-mentioned time index numbers and phases in order to achieve a connection between an inward and an outward PCM channel and how the index memories are addressed for a writing without disturbances of channel and time index numbers because this does not affect the invention. However, it should be noted that a write-read collision in the index memories is avoided most simply by controlling the operations with a mutual time displacement of about half a frame period. A write-read collision in the word memories is avoided, for example, if the computer controls the phase allottment so that the phases are excluded which fall within respective link time slots tla and tlb. Such a rule for phase allotment, however, raises the congestion risk. Another manner shown in FIG. 3 is that in the word memories in general writing is allowed only in the first and reading only in the second half of the phases.

As a switching example it is assumed in FIGS. 2 and 3 that with frame periods $F = 125$ $\mu s$, $q = 2^5 = 32$ link channels, $m = 2^6 = 64$ phases per frame period and with $s = 2^{13} = 8192$ bus channels, write-read collision is avoided in the word memories Wa, Wb by means of write and read command pulses obtained on outputs $\phi 1$ and $\phi 2$ of the timing generator TG. Furthermore, it is assumed that on the inward link La the channel which is determined by means of the channel index number $za = 6$ is switched to a channel determined by means of an arbitrary index zb on the outward link Lb and that the computer for this connection has selected the phases determined by means of the phase numbers $y = 11$ and $y = 12$ and the bus time slot with the length T2 determined by means of the time index number $x = 125$ within said phase with the phase number $y = 11$.

The timing generator TG is driven by a not-shown oscillator for $8000 \cdot 8192 = 65536000$ Hz. By means of this base frequency and owing to frequency divisions and time displacements known per se there are obtained on the outputs of the timing generator according to FIG. 3 the following pulse trains: On the output $\phi$ timing pulses are obtained synchronously with the base frequency for controlling the time counters TCa, TCb of the high-rate part. On the output $\phi$ F frame pulses are obtained by means of a dividing the base frequency by $2^{13}$. One obtains, that the link time slot which is defined by means of channel index $z = 6$ comprises the period between the base frequency pulses 1281 and 1536 as shown in FIG. 3. The pulses 1283 and 1343 are used in order to produce, by means of time displacement, on the output $\phi$ 1 the write command pulses for the inward word memory and the read command pulses for the outward word memory. Furthermore, it is seen that the phases determined by means of said phase numbers $y=11$ and $y=12$ comprises the pulses 1281 and 1408 and the pulses 1409 and 1536 of which the pulses 1347 and 1407 and the pulses 1475 to 1535 are used in order to produce, by means of time displacement, on the output $\phi$ 2 the read command pulses for the index memories Ia, Ib, and of which the pulses 1406 and 1534 on the output $\phi$ 3 are used as phase signals of the high-rate part.

In the assumed switching example consequently the writing in the inward memory element group defined by means of channel index $za=6$ is finished at the latest at the pulse 1343. Within such phase with the phase number $y=11$ at the pulse 1347 the read operations of the index memories Ia and Ib are started so that the memory element group determined by means of $za=6$ is accessed by means of the decoder IDECa for reading and that, in the phase signal pulse 1406, the respective PCM word is transferred via a word gate WGA to the inward buffer register Ra and the time index number $x=125$ is transferred via index gates IGa, IGb to the inward and outward time counters TCa, TCb. According to FIG. 2 these time counters are down-counters which count backwards from start values which are the time index numbers $1 \leq x \leq 127$. The counting down is controlled by means of pulses received from control gates CG, which pulses except for the phase signal pulses consist of the base frequency pulses. When the counts reach zero—the counters open sluice gates SGa, SGb associated with the respective link and connected to the bus IHW. Consequently by means of the time counters a time displacement is carried out. According to the switching example, the phase signal pulse 1406 is displaced 125 base frequency pulses so that the sluice gates are activated during the pulse 1531. The sluice-in gate SGa has its information input connected to the output of the inward buffer register Ra and the sluice-out gate SGb has its output connected to the input of the outward buffer register Rb so that the respective PCM word is transferred in the bus time slot defined by means of pulse 1531 from the inward to the outward buffer register. In the meantime, the channel index zb stored in the outward index memory Ib is fed because of phase number $y=12$ at the pulse 1475 to decoder IDECb to activate outward word memory Wb for writing. For the outward switching the respective PCM word is transferred during the phase signal pulse 1534 from the buffer register Rb via a word gate WGb to the word memory Wb, in which the PCM word is stored and from which the PCM word is read by means of a low-rate scanning arrangement LRS during the link time slot which is allotted to the channel index zb.

In the above described example the minimal switching time of the system is obtained with $zb=7$. In another switching example with $za=zb=6$ in connection with the phase numbers $y=10$ and $y=11$ the maximal switching time of the system is obtained which maximal time due to the two time switchings constitutes two frame periods, in agreement with known time-space-time systems.

The invention has been described here above by means of an application on an exchange which comprises n inward and outward links with q information channels. It is, however, obvious that the invention also relates to an exchange which comprises na inward links with qa channels and nb outward links with qb channels. Besides the space and time switching, a change of the multiplex formation is hereby achieved, i.e., from qa to qb link time slots within a frame period. In the most general case, i.e., $na \neq nb$ and $qa \neq qb$, an exchange principally is designed for $nb \cdot qb \geq na \cdot qa$, and with reference to that it must be possible within a frame to read into an inward word memory stored all qa PCM words and to write in an outward word memory all qb PCM words switched to the channels of the associated link, respectively, each word during an allotted phase, and a phase must have a maximum time length which is less than the defined link time slots owing to the qa and qb channels.

We claim:

1. The method of integrated switching and transmission of PCM words which are incoming and outgoing on links each link having a plurality of channels, each channel being associated with a link time slot in a link frame, the switching being carried out by means of an interhighway bus acting as a common time multiplex connection on which the PCM words are transferred in bus time slots, the interhighway connected between inward traffic memory means, each associated with one incoming link, and outward traffic memory means, each associated with one outgoing link, each of said traffic memory means including a PCM word memory and an index number memory, respectively, said method comprising the steps of storing in corresponding locations of the index number memories of the respectively inward and outward memory means associated with an established connection in which the respective link is involved a channel index number associated with the incoming channel and a channel index number associated with the outgoing channel of the connection as well as a time index number which is the same for the respective inward and outward memory means, writing cyclically the incoming PCM words into the PCM word memories of the inward memory means, respectively, by means of a regular scanning occurring at a frequency defined by the link time slots, reading cyclically the outgoing PCM words from the PCM word memories of the outward memory means, reading cyclically the channel and the time index numbers from the index number memories by means of a regular scanning occurring at a frequency defined by index read out phases, each index read out phase comprising a number of the interhighway bus time slots and each interhighway bus frame including at least as many index read out phases as there are link time slots in a link frame, reading the PCM words from the PCM word memory into a buffer of the respective inward memory means in an irregular sequence determined by means of the channel index numbers read from the index number memory of said inward memory means, transferring the PCM words of an actual connection from the buffer of said respective inward memory means via the interhighway bus to a buffer of the respective outward memory means under the control of the time index number associated with the connection and read from the index number memories of said inward and outward memory means, and writing into the PCM word memory the PCM words from the buffer in the respective outward memory means in an irregular sequence determined by means of the channel index numbers read from the index memory of said outward memory arrangement.

2. Method according to claim 1 wherein the number of channels is equal in incoming and outgoing links.

3. An exchange for integrated switching and transmission of PCM words which are received as incoming PCM words in incoming channels on at least one incoming link and sent out as outgoing PCM words in outgoing channels on at least one outgoing link, the channels being assigned link time slots in the links, the exchange comprising:

(a) an inward traffic word memory means, connected to the incoming link, for storing the incoming PCM words from the incoming link, said inward traffic word memory means having a plurality of indexed positions, each associated with a different one of the incoming channels of the incoming links;

(b) an outward traffic word memory means, connected to the outgoing link, for storing outgoing PCM words before transfer to the outgoing link, said outward traffic word memory means having a plurality of index positions, each associated with a different one of the outgoing channels of the outgoing link;

(c) an interhighway bus means connected to said inward and outward traffic word memory means and arranged as a time multiplex connection common for all PCM words wherein PCM words are transformed during assigned bus time slots;

(d) a timing generator means for producing a pulse frequency and multiples of the pulse frequency, wherein the pulse frequency determines frames of the PCM words, a first frequency multiple determines index read out times, a second and a third frequency multiple determines link time slots during which the PCM words are transferred on the incoming and outgoing links, respectively, and a fourth frequency multiple determines bus time slots during which the PCM words are transferred on the interhighway bus means, the fourth frequency multiple being a multiple of the first frequency multiple which is at least equal to the larger of the second and the third frequency multiple, said bus time slots being grouped into phases associated with the index read out times;

(e) inward traffic index memory means, associated with the incoming link, and outward traffic index memory means associated with the outgoing link, for storing in corresponding locations, in order to establish a connection in which the respective link is involved, a channel index number indicating the respective channel of the connection and a time index number allotted to the connection in order to determine which bus time slot within a phase is used on the interhighway bus means;

(f) inward traffic scanning means for controlling the writing of the incoming PCM words of the channels of the incoming link into the indexed positions of the inward traffic memory means associated with the channels, said inward traffic scanning means stepping in a fixed-cycle operation determined by said second frequency multiple;

(g) outward traffic scanning means for controlling the reading of the outgoing PCM words from the indexed positions of the outward traffic memory means to the association channels of the outgoing link, said outward traffic scanning means stepping in a fixed-cycle operation determined by said third frequency multiple;

(h) index scanning means for controlling the reading of the channel and time index numbers from said traffic index memory means, said index scanning means being stepped forward by a fixed-cycle operation determined by said first frequency multiple;

(i) a plurality of decoder means, each associated with a different one of the links, for decoding the channel index numbers read from the associated traffic index memory means in order to access the associated inward traffic word memory means for reading out the PCM word stored in the indexed position associated with the decoded incoming channel index number and the associated outward word traffic memory for making available the index position associated with the decoded outgoing channel index number for receiving and storing a PCM word, respectively;

(j) an inletting means associated with the incoming link and having an input connected to the inward traffic memory means and an output connected to the interhighway bus means for transferring PCM words thereto in bus time slots which are determined by the time index numbers; and (k) an outletting means associated with the outgoing link and having an input connected to the interhighway bus means and an output connected to the outward traffic memory means for accepting the PCM words from the interhighway bus means in bus time slots which are determined by the time index numbers for subsequent transfer to the outward traffic memory means.

4. The exchange according to claim 3, wherein the timing generator means produces second and third frequency multiples which are equal.

* * * * *